United States Patent
Kisters (10) Patent No.: US 9,240,880 B2
(45) Date of Patent: Jan. 19, 2016

(54) DISTRIBUTED DATA STORAGE DEVICE

(75) Inventor: Friedrich Kisters, Kreuzlingen (DE)

(73) Assignee: Human BIOS GMBH, Kreuzlingen (CH)

( * ) Notice: Subject to any disclaimer, the term of this patent is extended or adjusted under 35 U.S.C. 154(b) by 844 days.

(21) Appl. No.: 12/989,180

(22) PCT Filed: Apr. 23, 2009

(86) PCT No.: PCT/EP2009/002954
§ 371 (c)(1),
(2), (4) Date: Nov. 17, 2010

(87) PCT Pub. No.: WO2009/130022
PCT Pub. Date: Oct. 29, 2009

(65) Prior Publication Data
US 2011/0060920 A1    Mar. 10, 2011

(30) Foreign Application Priority Data
Apr. 23, 2008  (AT) .................................. A 643/2008

(51) Int. Cl.
| H04L 9/00 | (2006.01) |
| H04L 29/06 | (2006.01) |
| H04L 9/08 | (2006.01) |
| H04L 9/14 | (2006.01) |
| H04L 9/32 | (2006.01) |

(52) U.S. Cl.
CPC .............. *H04L 9/002* (2013.01); *H04L 9/0894* (2013.01); *H04L 9/14* (2013.01); *H04L 9/3234* (2013.01); *H04L 63/06* (2013.01); *H04L 2209/56* (2013.01); *H04L 2209/60* (2013.01)

(58) Field of Classification Search
None
See application file for complete search history.

(56) References Cited

U.S. PATENT DOCUMENTS

| 6,098,056 A | 8/2000 | Rusnak et al. |
| 6,363,481 B1 | 3/2002 | Hardjono |
| 6,785,810 B1 | 8/2004 | Lirov et al. |
| 2002/0161880 A1 | 10/2002 | Kishimoto et al. |
| 2003/0105830 A1* | 6/2003 | Pham et al. .................. 709/216 |

(Continued)

FOREIGN PATENT DOCUMENTS

| DE | 199 25 910 | 2/2001 |
| WO | WO 95/22111 | 8/1995 |
| WO | WO 2008/021075 | 2/2008 |

OTHER PUBLICATIONS

International Search Report issued for PCT/EP2009/002954 and dated Sep. 30, 2009.

*Primary Examiner* — Kaveh Abrishamkar
(74) *Attorney, Agent, or Firm* — McHale & Slavin, P.A.

(57) ABSTRACT

The invention relates to a distributed data memory unit comprising a plurality of memory units, each having memory means and an access controller, an authentication unit comprising memory means and a validation unit, an execution controller comprising an execution controller module and an access verification unit, the execution controller communicating with the memory units and the authentication unit. At least one unambiguous electronic cipher is stored in the memory means of the authentication unit, the access verification unit has an access controller module and a memory unit. A first unambiguous cipher, which corresponds to a stored cipher of the authentication unit is stored in the memory unit and an assignment table is stored in the memory means of the memory unit. The invention also relates to a method for operating a distributed data memory unit.

12 Claims, 3 Drawing Sheets

(56) References Cited

U.S. PATENT DOCUMENTS

| | | | |
|---|---|---|---|
| 2007/0190977 A1* | 8/2007 | Fok et al. | 455/411 |
| 2007/0289026 A1 | 12/2007 | Newcombe et al. | |
| 2008/0046748 A1* | 2/2008 | Fujimoto | 713/182 |
| 2008/0152145 A1* | 6/2008 | Fujioka | 380/277 |

* cited by examiner

DISTRIBUTED DATA STORAGE DEVICE

This application is a U.S. national stage of PCT/EP2009/002954 filed on Apr. 23, 2009 which claims priority to and the benefit of Austrian Application No. A643/2008 filed on Apr. 23, 2008, the contents of which are incorporated herein by reference.

The invention pertains to a distributed data storage device comprising a plurality of storage units, each with a storage means and an access controller; an authentication device with a storage means, and a validation device; and a sequence controller with a sequence control module and an access monitoring device, wherein the sequence controller is connected communicatively to the storage units and to the authentication device.

In the area of data processing devices, many different devices are known for storing data or information and for making it possible to access that information later. In the case of so-called "single-site" systems, the data storage unit and the access controller are usually integrated with each other, which in most cases allows a user or a sequence controller to access the stored data directly. When the demands on the quantity of data to be administered increase, however, and/or when it is likely that that a large number of users will be accessing the stored data more-or-less simultaneously, a single data storage unit will usually not be able to meet these increased demands or provide adequate performance or processing speed. Therefore, a plurality of data storage units is usually installed, and the information to be stored or administered is divided among the individual storage units. In this case, a central access controller takes over the job of coordinating, monitoring, and controlling access to the individual storage units and therefore ensures that the user remains unaware that the structure is distributed.

Because the data units to be administered can be divided over several storage units, measures must be taken to represent and to administer the relationships between the storage units. For example, WO 95/22111 discloses for this purpose a distributed database system, which comprises a plurality of interconnected computer units, which administer the individual databases of the database system. Each database comprises records, in which a relationship of the global structure of the computer units is stored. In addition, a local assignment rule stores the information where the individual data units are filed in the local computer unit.

The gross structure of the data storage units is therefore determined by the global information units, and the structure of the individual storage unit is determined by the local information units.

Of essential importance in a distributed data storage device is the issue of the security of the stored information against unauthorized access, especially because this information is stored in distributed systems, wherein in certain cases these systems can also be in different physical locations. It must therefore be ensured that access to the stored information is possible only after appropriate authorization.

To this end, U.S. Pat. No. 6,098,056 A, for example, discloses a system and a method for controlling and monitoring access rights in a distributed information system by the use of an asymmetric encryption system. The network comprises at least one server, which is connected to a storage unit and is designed for the storage of limited-access documents. To accomplish the goal, a random document key is generated, which is encrypted by the public key of the server and stored as meta-information in a data container. After an access control device has been authenticated, the document key is encrypted with the public key of the access control device, which ensures that only the access control device can remove the key and access the content. The decrypted content of the document is then displayed to the user on the client.

US 2007/0289026 A1 also discloses a system for securing information or for exchanging information in a distributed system. The system comprises a data storage device and a secure information administration device. The information units can be encrypted and can be digitally signed before they are transmitted to an authenticated client.

WO 2008/021075 A2 discloses a method for securing communications in a data network. Each of the distributively stored security policies characterizes a security group, wherein each of these security groups comprises at least one local and one remote data node. If a new security group is to be added to the system, a local certification site issues a series of requests for the purpose of identifying and authenticating the local nodes in the new security group. After that, the security certification site can secure the communications between the local and remote nodes by the exchange of security information.

The devices and methods known from the prior art are designed to secure access to data in a distributed network and to manage the exchange of data between distributed nodes in a network by defining authenticated security groups, for example. In the case of the known devices and methods, the main focus of attention is on the security of the communications between the individual network nodes and/or on the security of the access to the network nodes. For a high-security data storage facility, especially if it is intended to meet the requirements of the financial industry, it is necessary not only to secure the communications routes but also in particular to provide increased protection of the data themselves. The protection of each individual storage unit is extremely important especially in the case of distributed data storage units, which, in certain cases, can also be distributed over several physical locations for reasons of redundancy or load distribution. In particular, it is especially important to make sure that, even if someone has knowledge of the content of one data storage unit, he would be unable to access or to derive the content of any other data storage unit.

The goal of the invention is to provide a data storage device which stores the data units in a plurality of distributed storage units, wherein the assignment of the data records to the storage units is stored separately from the control of access to the storage units, which means that access to the data units is possible only after unique authentication of the accessing modules. It is also a goal of the invention to design the data storage device in such a way that only a uniquely identified group of access modules can access the storage units.

The goal of the invention is achieved in part in that at least one unique electronic key is stored in the storage means of the authentication device. This design makes it possible for the authentication device to assume the role of central administrator of all possible permitted electronic keys. With respect to high data security, this feature offers the very special advantage that the authentication device and especially the storage means of the authentication device can be installed in a high-security environment, which means that an extremely high level of protection is provided for the stored electronic key. In addition, the authentication device can be designed so that it is impossible for the stored electronic keys to be subjected to any subsequent revision or updating, which represents an additional and significant increase in security. In any case, the authentication device is designed in such a way that access to the storage means is possible only by way of a precisely defined communications route, which is monitored and controlled in particular by the authentication device.

As another feature contributing to the achievement of the goal of the invention, the access monitoring device comprises an access control module and a storage means, so that it is also guaranteed here, too, that not even the sequencing control module of the sequencing controller can access the storage means directly, and thus every access proceeds by way of the access control module and/or is administered by it. An "access control module" can be understood here to be the technical device which receives an incoming request over a communications link, processes that request appropriately, and executes the technical steps necessary to extract the relevant information units from the storage means. The information units are then processed as appropriate and sent back to the requesting module.

The goal of the invention is also achieved by a feature according to which a unique first key corresponding to a key stored in the authentication device is stored in the storage unit. This guarantees that the storage unit and the authentication device comprise a common characteristic feature, which even more importantly is a unique feature, by means of which a unique relationship is established between the storage unit and the authentication device. Because the authentication device has electronic keys stored in it, only a storage unit with a key which corresponds to a stored key can establish a relationship with the authentication device.

Here and in the following, "keys" are considered to be any known designs of electronic keys which make it possible for two separate systems to be assigned uniquely to each other by means of a common feature. For example, a key can be stored in both modules, as a result of which the basic requirement of a unique assignment is covered. But an asymmetric key system is also possible, which offers the advantage that it can also be used simultaneously for encryption tasks.

In a distributed data storage facility, it is necessary to administer the relationships between the individual data units, so that access can then be granted to the distributed data units. In the case of known data storage devices, the assignments are always stored in the storage units together with the payload data. This approach suffers from the disadvantage that, if a storage unit is accessed successfully without authorization, information which can be used to access other storage units is always accessible also. Of particular importance, therefore, is the feature that an assignment table is stored in the storage means of the access monitoring device, because by this means the data units are separated from the relationships between the data units. In the interests of securing the stored data, it is extremely important that it be impossible to access data units of other storage units even in the knowledge of the content of the data units of one storage unit and in particular that it be impossible to infer the content of other data units. This inventive feature now guarantees in highly advantageous fashion that the storage units of the inventive distributed data storage device can be designed as individual functional units and possibly can also be installed in different physical locations.

A very essential advantage of the inventive data storage device is also to be found in the fact that communications between the individual components can be effectively controlled or defined. Because the sequencing controller is able to communicate with the storage units and with the authentication device—there being, therefore, no direct communications link between the individual storage units, direct access from one storage unit to another storage unit is prevented to the greatest possible extent. In particular, it is therefore also possible for access to be controlled effectively, because communication occurs essentially by way of the sequencing controller, and this can have every access additionally authenticated by the authentication device if desired. The access rules can therefore be stored in the sequencing controller, but it is also possible for the authentication device to take over the job of controlling and/or monitoring accesses.

For example, an additional monitoring device can be present, which monitors each access and, upon the occurrence of a deviation from a permitted access attempt, will initiate, for example, the immediate termination of the currently running access. A monitoring device of this type can also monitor the integrity of the individual modules so that it can detect any attempt at manipulation.

Aiming in the same direction is an elaboration in which the access monitoring device comprises an additional storage unit, in the storage means of which the execute statements are stored. This elaboration achieves the most complete possible separation between the data units, the relationship structure, and the access and execution control. In particular, it is therefore possible for each individual component of the inventive data storage device to be designed separately, as a result of which maximum protection against unauthorized access to the data units is achieved. A potential attacker would therefore have to obtain control over a plurality of individually secured components before he could arrive at the data units of interest to him and/or to data units which could be misused.

For the structure and operation of the inventive distributed data storage device, an elaboration is advantageous in which the storage units and the sequencing controller are connected to each other communicatively by a first communications link. This first communications link can be formed by any desired technical data communications network, such as by an intranet or by the Internet. In particular, the communications link can be formed by a point-to-point connection, which offers the special advantage that the intermediate nodes or transfer nodes present in the communications route are unable to access the transmitted information or data in unauthorized fashion. In particular, however, this design offers the advantage that the operational state of the storage units can be checked, which is especially important with respect to the reliability of the data storage device. A point-to-point connection could be formed, for example, by a hard-wired communications route or by a so-called VPN (virtual private network) connection.

With respect to the security of the communications between the storage units and the sequencing controller, an elaboration is advantageous in which the storage unit and the sequencing controller comprise encryption modules. These encryption modules are designed to secure the communications between the storage unit and the sequencing controller in such a way that it is possible in principle to use an unsecured communications connection to establish a communications link between the storage unit and the sequencing controller. The encryption module can function on the basis of, for example, a public key system, as a result of which communications between the key partners is possible in simple fashion, but at the same time unauthorized eavesdropping on the transmitted information is prevented to the greatest extent possible. Of course, other known encryption methods can be used by the claimed encryption module. In particular, the encryption can be designed in such a way that each communications link is secured by an individual encryption system. Known encryption methods are usually based on a pseudo-random code, which can in certain cases be intercepted by an attacker, as a result of which he can gain access to the transmitted information. An elaboration could consist, for example, in that a multi-stage encryption method is used. In a first step, a link secured by a pseudo-random code is established. Secured by asymmetric codes, the keys which are used to implement an end-to-end encryption are then exchanged over this link. Before he could have any chance to gain unauthorized access, a potential attacker would therefore not only have to deal with the first encryption of the channel but also manipulate the synchronization mechanism involved in the exchange of the keys. As a result of this multi-stage security system, it is extremely complicated or even impossible to launch an attack based on currently known decryption methods within the period of time during which the information remains relevant.

According to the invention, a relationship is established between the individual storage units on the basis of the unique keys stored in the storage units and an assignment table stored in the access monitoring device. By means of a claimed elaboration, in which a second unique electronic key corresponding to a key stored in the authentication device is also stored in the storage unit, it is now guaranteed in advantageous fashion that, in addition to the relationship of the storage units with each other, a relationship between the storage units and the authentication device is also established. In particular, a so-called "reverse check" is possible, that is, the access controller can check the authenticity of, for example, the sequencing controller.

The inventively used electronic keys are especially important, because they must make a unique assignment possible, and therefore each key or each key combination must be completely unique, so that an unauthorized person cannot guess them. It is therefore highly advantageous for the authentication device to comprise a module for generating electronic keys. Because, according to the invention, at least one unique electronic key is stored in the storage means of the authentication device, the claimed elaboration offers the special advantage that the generation of the electronic keys and their subsequent storage can take place completely in the authentication device without the need for any external device, the presence of which would mean another security weak point, for example. The generation and administration of unique electronic keys can thus be handled by one central device.

In the inventive distributed data storage device, a plurality of keys is used to establish unique relationships between the individual modules of the data storage device. The keys are preferably designed in such a way that, for every module key, such as the key of a storage unit, there is always a corresponding key in the key memory. This correspondence means in particular that the relationship is established by the key itself. In one embodiment, each module key can agree with a so-called "reference" key. It is also possible, however, to derive a plurality of module keys from a so-called reference key in the key memory, and, when a check is run, these module keys then allow a relationship to be established with the reference key. Preferred is an embodiment in which a module key can be assigned uniquely to a reference key but in which it is impossible for the reference key to be inferred. Thus an attacker is unable to generate a forged module key which could be used to achieve unauthorized access.

It is also possible for a plurality of reference keys, from which, as needed, module keys can be generated, to be stored in the key memory. This offers the advantage that the key memory can be secured very effectively in such a way as to prevent changing access to the memory.

Also advantageous is an elaboration in which the storage means of the storage unit is formed by a database system, because such database systems are very effectively designed to hold and to administer large numbers of data units. Such storage means also have the additional advantage that they are designed from the beginning to offer a very high level of storage security for the stored data and especially also a very high level of access security. The storage means for storing the data units is preferably designed to handle the highest possible number of simultaneous accesses to a large quantity of information units. The storage means for storing the assignment table or the execute statements should preferably offer the fastest possible response speed, because all additional accesses to other storage units depend crucially on it. A data processing system, which usually offers a very high processing speed, can therefore be used as the storage means for these storage units.

An elaboration can also consist in that the physical storage medium can be formed by a ferromagnetic storage medium, especially by a so-called "hard disk", wherein this is designed with data encryption. In the case of encryption of this type, the data are stored in encrypted form on the storage medium, wherein the encryption-decryption system is resident in the access controller. An attacker would therefore have to steal the entire storage unit, because no useful information can be extracted from the encrypted storage medium alone. Even if an attacker breaks the encryption of the storage medium, the data gain thus obtained is extremely small, because, as a result of the distributed storage of the information units, access to other information units is prevented to the greatest extent possible. In particular, the attacker lacks information concerning the relationships between the storage units. This data encryption system could also be expanded, for example, by including the feature that the stored data are validly accessible only during ongoing operations, which means that an attacker would have to steal the storage medium without interrupting the ongoing operations of the system.

In particular, "storage means" are understood to be any of the devices which are known to the person skilled in the art as suitable for storing information units. Semiconductor memories and tabular data files can be listed here as examples.

According to claimed elaborations, a first and/or a second unique key is stored in the storage unit of the assignment table or in the storage unit of the execute statements; this key corresponds to a key stored in the authentication device. The advantages of this elaboration have already been described above; in particular, it is possible to check the authenticity of both the storage units and the sequencing controller.

An especially advantageous elaboration is obtained by designing the access monitoring device in such a way that the access control module and the storage units are connected to each communicatively by a second communications link. The sequencing controller and the storage units of the access monitoring device represent essential components of the technical security measures and of the access protection for the storage units of the data units. Therefore, these units are preferably installed in closed facilities, wherein great value is placed on security against unauthorized access. The communicative connection between the storage units and the access control module of the access monitoring device proceeds over the second communications link, which preferably is formed by a point-to-point connection, which, according to this embodiment, is specially protected against unauthorized access. Any technical data communications network can be used as the communications medium for establishing the second communications link, wherein this network must, however, meet the special requirements pertaining to the security of the second communications link.

This elaboration makes it possible to implement an additional access security measure, because it is now also possible to define the communications routes for the querying instructions or transactions. Thus another way in which an unauthorized access attempt can be detected immediately is on the basis of the arrival of a request at a component over an unallowed communications route.

In the known data storage devices, the sequencing controller usually accesses the storage units and especially the stored data units directly, once authentication has been completed or the access privilege has been checked. With respect to providing a high level of protection of the data against unauthorized use, this access mode suffers from the disadvantage that, if a potential attacker is able to bypass the authentication measures, he could gain direct access to the stored data units. With a claimed elaboration in which a plurality of hierarchically structured sequences are stored in the sequencing control module, such direct access is prevented, because access to the storage units is possible only by the use of the stored sequences, and, in particular, direct access to the storage units is blocked.

An elaboration in which a linkage of a hierarchical sequence to a storage unit is stored in the assignment table also serves to protect the stored data, because in this way another security level is created. With the claimed elaboration, the place where the hierarchical sequences are stored can therefore be separated completely from the place where they are executed, which results in the creation of yet another security hurdle for any potential attacker.

Of very special importance are claimed elaborations according to which the authentication device, the sequencing controller, and the storage unit form a first security zone and/or the sequencing controller, the assignment table, and the execute statements form a second security zone. These security zones are a highly essential concept of the inventive distributed data storage device, since they prevent a potential attacker from gaining access to the entire system by manipulating a single component. Each of these security zones can be monitored continuously, for example, by a monitoring and checking device so that an unallowed process can be detected immediately. In particular, a potential attacker would always have to manipulate at least two components of a security zone simultaneously, and in particular he would also have to manipulate them synchronously in order to conceal an unauthorized access attempt. Because the access sequence is also a highly essential part of the inventive data storage device, a potential attacker, to have any chance of success, would have to have extremely accurate details of the internal relationships to enable him to launch a targeted and synchronized attack on several components.

By means of the monitoring or control of the accesses, the claimed elaboration also ensures, for example, that direct access by a module of the first security zone to a module of the second security zone or to some other module is blocked to the greatest possible extent. Because accesses are possible only over precisely defined communications routes and under maintenance of fixed sequences, any access attempt deviating from those routes or sequences can be detected immediately as a potential attack and blocked by means of appropriate countermeasures. In particular, the definition of the correct communications route can also be changed at periodic intervals. For example, an algorithm can determine the communications route valid at any one time as a function of previous accesses and/or on the basis of time functions. This represents yet another hurdle for the attacker, because a request arriving over an invalid communications route would be detected as an attempt at manipulation.

In an elaboration, additional protection zones can be introduced, so that individual technical units such as the storage units, for example, can be combined into their own protection zone. For an attacker, the hurdle to be overcome can thus be made even higher, because a plurality of different security systems would have to be breached, all of which, however, are interconnected by suitable functional dependencies, which prevent an individual attack and/or make it very easy to detect such an attack.

The goal of the invention is also achieved by a method for operating a distributed data storage device. In a first step of the method, a unique electronic key is generated, wherein this key can also be formed by a key pair or by a set of uniquely associated keys. In this regard, the person skilled in the art will be familiar with other key systems. This key or partial key is stored both in a storage unit and in an authentication device and thus makes it possible for a storage unit to be uniquely authenticated. In additional steps, an assignment table and execution instructions are stored in an access monitoring device.

The steps of the inventive method ensure that the data units stored in the storage units are kept separate from the information on the structure of the data units or on the dependencies between them and that in addition direct access to the data units is prevented.

An attacker could, for example, attempt to manipulate a storage unit for the purpose of gaining access to other storage units. To prevent this, according to an elaboration, the key is checked by the authentication device before access is granted to a data unit stored in the storage means of the storage unit. Only if the stored key agrees with a key stored in the authentication device is it ensured that the storage unit currently being accessed also corresponds to the originally authenticated storage unit.

An elaboration which ensures that direct access to storage units is prevented consists in that the assignment table is queried when an access request is made. Because of the distribution of the data units over several storage units, the relationship between the individual data units can be established only by reading out the linkage between the data units and/or in particular between the storage units from the assignment table.

An elaboration in which the execute statement is queried when a user or a data processing device makes an access request also has the goal of preventing unauthorized access to the data stored in the storage units. This embodiment represents an additional feature which prevents an unauthorized user from being able to access directly the records in a storage unit. Only by means of an appropriate execute statement, which in turn can be read out only by way of the access monitoring device, is it possible to gain access to data units in the storage unit.

According to an advantageous elaboration, the electronic key is checked by the authentication device before access is granted to the assignment table stored in the storage means of the storage unit. This embodiment represents another security feature, since now the authenticity of the assignment table can also be checked. Because the relationship between the data units, for example, is established on the basis of this table, it is especially important that the content of the assignment table be authentic.

The same also applies to an elaboration according to which the electronic key is checked by the authentication device before access is granted to the execute statement stored in the storage means of the storage unit. It is thus possible for the authenticity of the execute statement to be uniquely ensured.

As previously described, an elaboration in which the key stored in the access instruction is checked by the authentication device offers the advantage that only an access instruction with a correct key is accepted by the authentication device, whereupon access to the storage units is enabled.

Again for the purpose of providing unique access security, an elaboration is advantageous in which a sequencing controller is authenticated to the authentication device by means of a correct stored key. As a result of this elaboration, it is now also ensured that the execution of access to storage units can occur only by means of a correctly identified and authenticated sequencing controller. This also makes it impossible for a potential attacker to gain access to storage units by manipulating a sequencing controller.

If disagreement is detected when the presented key is checked against the stored keys, an alarm message is transmitted according to the claims, so that a response can be made immediately to the faulty authentication. The currently running access is preferably stopped, and a detailed examination is made of the reasons which led to the alarm message. The essential point here is that, before a data unit can be accessed, possibly several keys are checked, and access to the data units is granted only after all of these keys have been checked successfully. If a potential attacker manipulates one of the components of the distributed data storage device, a key will no longer agree with a stored key, and as a result an alarm is triggered and further access is prevented.

Additional advantageous embodiments are obtained when an access controller of the storage units compares a second stored electronic key with a key of the sequencing controller upon receipt of a request from the sequencing controller or upon the checking of the stored second electronic key by the authentication device. These embodiments make possible a so-called "reverse check", so that the storage unit itself can also check to see whether the requesting sequencing controller is in fact the originally authenticated sequencing controller. A potential attacker could attempt to manipulate the sequencing controller as a way of gaining access to the storage units, but this is prevented by the claimed elaborations.

Of particular importance is an elaboration according to which the access controller accesses the data units by means of a transmitted execute statement, because this ensures that direct access to the data units is prevented or made impossible. Known data storage devices usually allow direct access to the data units. A potential attacker can thus gain access to data units by manipulating the execute device. The claimed elaboration introduces here an additional security barrier, meaning that an attacker would now also have to obtain the execute statements before he could gain access to the data units.

So that the invention can be understood more clearly, it is explained in greater detail below on the basis of the following figures.

In simplified, highly schematic fashion.

By way of introduction, it should be kept in mind that, in the various embodiments described below, the same parts are identified by the same reference symbols or component designations, wherein the disclosures contained anywhere in the description can be carried over by analogy to the same parts bearing the same reference symbols or component designations. The positional indications used in the description, such as top, bottom, side, etc., furthermore, pertain to the figure being described and illustrated then and there, and when there is a change in position they can also can be carried over by analogy to the new position. Individual features or feature combinations taken from the various exemplary embodiments illustrated and described here can also represent in themselves independent inventive solutions or solutions in accordance with the invention.

All of the data on value ranges in the concrete description are to be understood in such a way that they comprise any and all partial ranges, e.g., the statement "1-10" is to be understood in such a way that all partial ranges proceeding up from the lower limit of 1 and down from the upper limit of 10 are also included, that is, all partial ranges beginning with a lower limit of 1 or greater and ending at an upper limit of 10 or less, e.g., 1-1.7 or 3.2-8.1 or 5.5-10.

Figure 1:
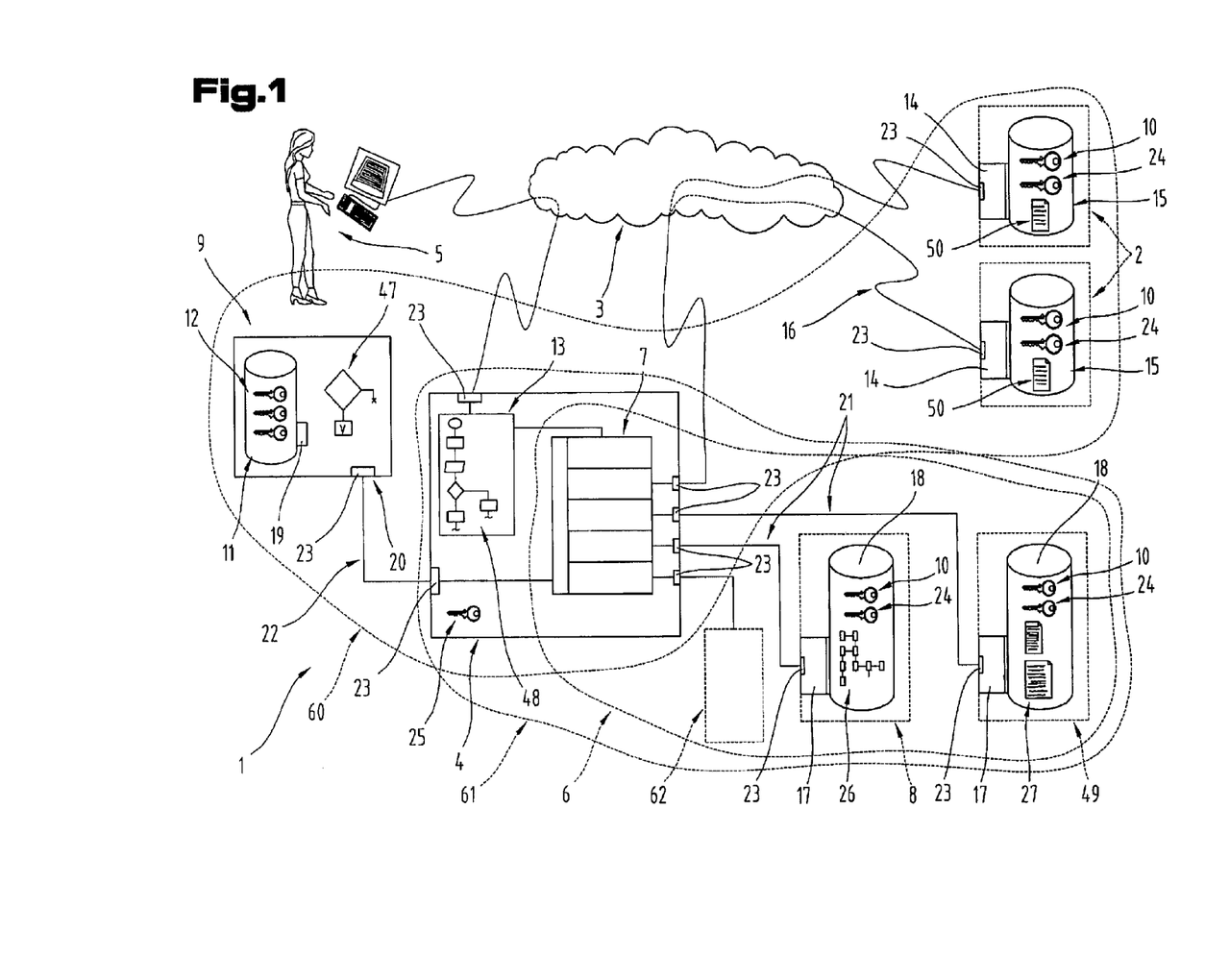
FIG. 1 shows a basic schematic diagram of the inventive data storage device.

FIG. 1 shows a basic schematic diagram of the distributed data storage device 1, in which data or information 50 is stored in a plurality of storage units 2. The storage units 2 are connected to a sequencing controller 4 by a communications network 3. The sequencing controller 4 is designed to process a request from a user 5 and to call up the corresponding information from the storage units 2 and transmit it to the user or to his terminal 5. Because the storage units 2 can be arranged in distributed fashion in certain cases, in particular because they can be in different physical locations, the information units 50 are divided over the individual storage units 2 in such a way that, even in the knowledge of the content of one entire storage unit and of parts of the information units stored therein, it is impossible to access the content of another storage unit and/or it is impossible to query a complete, usable data record. Therefore, the sequencing controller 4 comprises an access monitoring device 6, which is formed by at least one access control module 7 and at least one storage unit 8. It is of essential importance now that an assignment table 26 and/or execute statements 27 are stored in the storage units 8, 49 of the access monitoring device 6. This distributed arrangement ensures that none of the relationships between the data units 50 is stored in the storage units 2. It is especially important with respect to the security of the stored data, furthermore, that the sequencing controller 4 is connected to an authentication device 9. The authentication device 9 is designed in particular to check each access to the storage units 2 or to the storage unit 8 for plausibility and thus to guarantee that the only accesses which can be carried out are those which have the appropriate security features.

So that a relationship can now be established between the storage units 2, 8, 49 and the sequencing controller 4 in such a way that unauthorized access can be prevented, a first unique electronic key 10 is stored in each of the storage units 2, 8, 49. Keys 12 corresponding to the stored electronic keys 10 are stored in a key memory 11, so that there is always a unique relationship between a first electronic key 10 and a stored electronic key 12. If now, for example, a storage unit 2 is to be accessed, the first electronic key 10 of the storage unit 2 is read out by the sequencing controller 4, in particular by the access control module 7, and checked by the authentication device 9. If agreement is found, access to the storage unit is granted, and the remaining steps of the process are conducted according to stored hierarchical sequences 48. If the authentication fails, an alarm can be triggered by the authentication device 9 or by the sequencing controller 4, as a result of which security measures are activated and possibly physical protective measures are activated for the data storage device. Both the first key 10 and the second key 24 are preferably independent of each other, but each one corresponds to a stored key 12.

Each storage unit 2 comprises an access controller 14 and a storage means 15, wherein the access controller 14 is designed in such a way that a request arriving over the communications link 16 does not gain direct access to the storage means 15. The storage unit 8 also preferably comprises an access controller 17 and a storage means 18, so that here, too, direct access to the storage means 18 is prevented.

High demands with respect to uniqueness are also imposed on the electronic keys 12 stored in the key memory 11. In particular, it must be possible to establish a unique relationship between an electronic key 10, 24 stored in the storage means and a reference key 12, wherein this relationship can be set up in such a way that it is impossible to derive the reference key 12 from the module key 10, 24. In an especially advantageous elaboration, the authentication device 9 comprises a module 19 for generating unique electronic keys. With this module 19, it is now possible for the authentication device 9 to generate unique electronic keys by itself without the need for any external device or certification site. As a result of this embodiment, it is ensured advantageously that the electronic keys 12 are generated in a defined and known security environment and thus that the danger of external influence or forgery of the keys is prevented to the greatest possible extent. The security of electronic keys is usually based on mathematical methods, especially on systems of equations which are extremely difficult to calculate or to solve. In particular, an essential feature is that the necessary computing effort and the amount of time required to solve the system of equations can be estimated very accurately. An electronic key can therefore be designed in such a way that the time required to bypass the key is greater than the relevance of the information to be acquired illicitly. The authentication device 9 can, for example, be formed by a data processing device, but a design as a module which can be queried only by way of a communications connection 20 and which also provides the result of the authentication process is also possible.

For reasons of efficiency and security, the inventive distributed data storage device 1 can also be distributed physically in space, in which case a communications network 3 is installed between the individual modules such as the storage units 2, 8, 49, the authentication device 9, and the sequencing controller 4; in principle, this communications network must be considered an insecure network. It can be, for example, the publicly available and accessible Internet, so that the danger of unauthorized access to the communications links 16, 21 must be considered real. In an advantageous elaboration, it is now possible to secure each communications link by installing an encryption module 23 at each of the endpoints of the communications links. This encryption module now ensures that the communications link 16 between the endpoints, such as between a storage unit 2 and the sequencing controller 4, is secured on the basis of so-called "end-to-end" encryption. Even in the case of unauthorized access to the communications link 16, access to the transmitted data is to the greatest extent impossible.

The storing of first electronic keys 10 makes it possible to establish a relationship between the storage units 2, 8, 49. Thus the sequencing controller 4 can ensure that the correct storage unit is accessed in each case, in particular by using the authentication device 9. It is guaranteed in particular that a potential attacker is unable to replace a storage unit with a manipulated one as a way of gaining access to the distributed data units. As a result of the establishment of unique communications routes and access scenarios, it is impossible for a manipulated storage unit to gain direct access to any other storage unit or some other module. An unauthorized access attempt remains limited to the one storage unit, because, as a result of the established communications routes, the other modules, except for the sequencing controller, are invisible to the manipulated storage unit. In an elaboration, second electronic keys 24 are now also stored in the storage units; these second keys correspond to a key 25 of the sequencing controller 4 and/or to a stored key 12 in the authentication device 9. Through this elaboration, the access controller 14, 17, for example, is now able to check the validity of a request from the sequencing controller 4, especially from the access control module 7. When a request is received, the assigned key 25 is transmitted from, for example, the sequencing controller to the access controller 14, 17 and/or is queried by it. The access controller can now have the key 25 checked by the authentication device 9 and/or the access controller can itself perform the check on the basis of the stored second key 24. This elaboration guarantees that each storage unit can check by itself whether an incoming query request is originating from a valid, in particular an approved, sequencing controller 4. To gain unauthorized access to stored data units in a distributed data storage device 1 designed in this way, a potential attacker would have to manipulate a plurality of electronic keys and the authentication device simultaneously. The authentication device 9 and possibly also the sequencing controller 4 are preferably operated in a specially secured environment; in particular these devices are usually housed in high-security areas of data centers or financial institutions, as a result of which both personal and remote access to these modules is highly improbable. Because these modules, however, are the core components of the inventive distributed data storage device, and in particular because they take over job authenticating and monitoring, the securing of the data units stored in the storage units is therefore also ensured to the greatest possible extent. As a result of the distributed arrangement, which can possibly also be distributed physically in space, it is ensured that unauthorized access is extremely difficult, because such access would have to be conducted in a precisely coordinated manner with respect to both time and place so as not to trigger an alarm immediately and thus block the attempt at unauthorized access.

Another essential feature of the inventive data storage device is that the payload data are filed separately from the relationships between the payload data, and that direct access to the payload data is not possible. An assignment table 26, for example, is stored in a storage unit 8, wherein an effective link between the data units of the storage unit can be established only by way of this assignment table. In the known distributed data storage devices, an assignment table of this type is stored together with the data records in the storage units. Therefore, a potential attacker has available to him all the information he needs to read out the data records from the distributed storage units.

In the inventive distributed data storage device, the storage unit 2 for the data units, the storage unit 8 for the assignment table 26, and the storage unit 49 for the execute statements 27 must all be correctly identified to the authentication device 9 to release the data for access. It is also standard practice in the known data storage devices to grant a sequencing controller 4 direct access to the storage means 15 of a storage unit 2. In contrast, in the data storage device according to the invention, an additional security zone is introduced, in which direct access to the storage means 15 is not possible, because access to the storage means 15 can be gained only by way of predefined, checked, and authenticated execute statement 27.

An especially advantageous elaboration consists in that, within the data storage device, security zones 60, 61 are formed, wherein such a security zone comprises several modules, which possibly can also be arranged in distributed fashion. These security zones represent a second security layer in addition to the separation of the payload data from the relationship information. Because the security zones overlap, the currently running transactions and requests can be controlled or monitored from both sides. For example, a monitoring module 62, which monitors the sequences in the security zones and, if any inconsistencies are found, stops the transactions immediately and possibly sends an alarm message, could be connected to the sequencing controller. These security zones make it extremely difficult to attempt access without authorization, because the attacker would therefore be forced to launch an attack which has been prepared with an extremely high degree of precision. Several modules would have to be manipulated in a precisely defined sequence, which would be extremely difficult to do without very precise knowledge of the internal structure and procedures. Nor would a stepwise attack lead to the goal, because it could not remain undetected. A very considerable amount of effort is therefore required to make such an attempt at access, which, in combination with the high probability of failure, acts as a very strong deterrent.

In an elaboration, there could also be an external monitoring device present, which also checks the plausibility of the currently running transactions. Thus, for example, the sequences actually taking place could be compared with stored sequences so that any deviation can be detected. It is also possible to validate a transaction; that is, a transaction can be checked to see whether or not a request coming from a module agrees with the originally transmitted request or whether the request has been manipulated in some way as it traveled along the communications route.

These advantageous elaborations provide a considerable increase in the security of the stored data units in a distributed data storage device without resulting in a significant increase in the effort required to install the individual modules of the data storage device. In particular, only a few components need to be installed in a highly secure environment, because potential attackers cannot extract any usable information from the accessed data units even they have complete knowledge of a storage unit. The modules of the inventive data storage device can therefore be installed in the best possible way with respect to the performance requirements on the operating system without resulting in any loss of security.

In an advantageous embodiment, the access controllers 14, 17, for example, could be designed in such a way that they themselves can carry out parts of the authentication process. For example, a result of a partial encryption can be sent by the sequencing controller and/or the authentication device to the access controller, which then conducts the same partial encryption with a stored key 10, 24 and checks the result obtained. If the transmitted result agrees with the result produced, access is granted; otherwise, an alarm is possibly triggered. This elaboration offers the decisive advantage that stored keys do not have to be transmitted over the communications link, which represents yet another significant security feature of the inventive data storage device.

Figure 2:
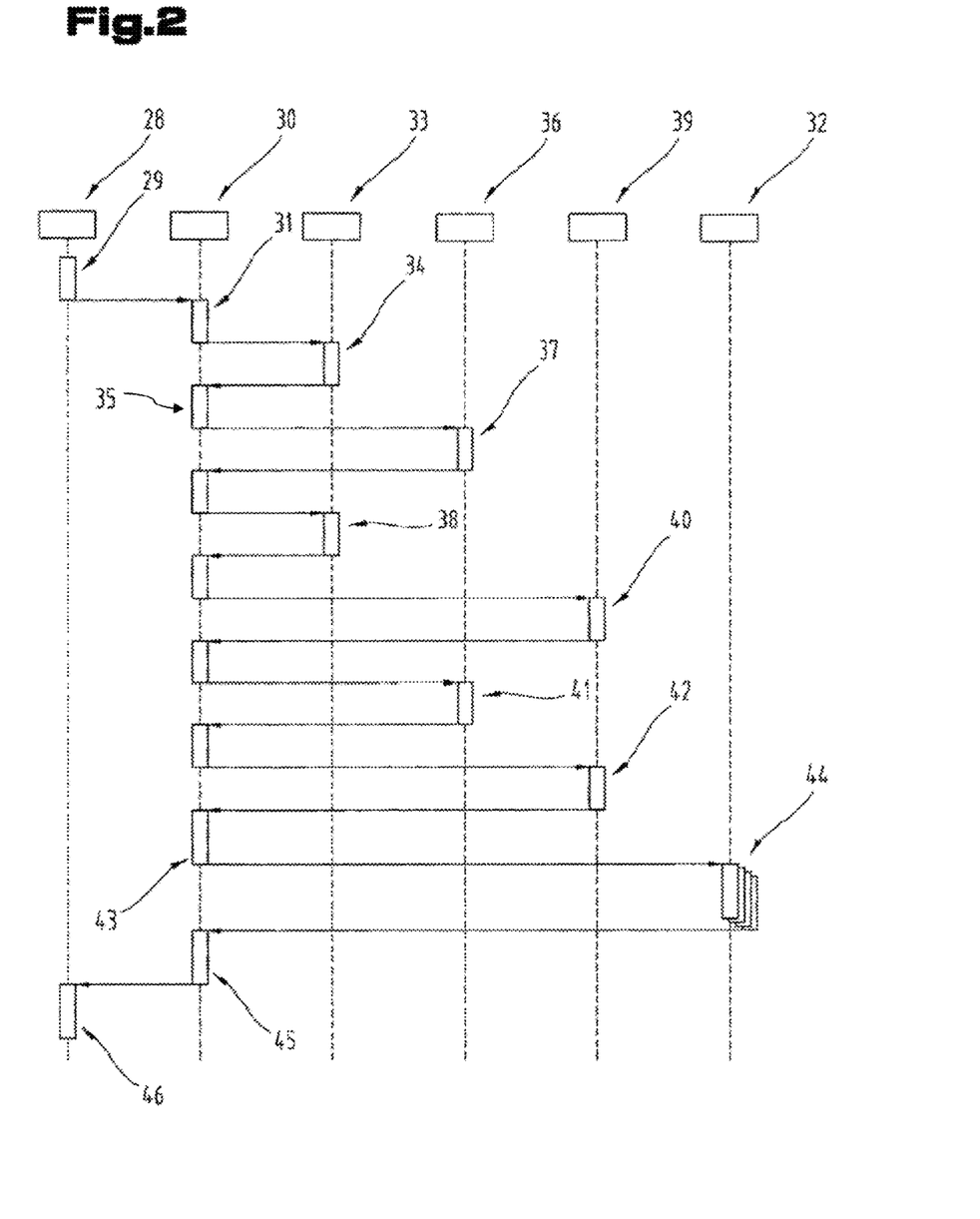
FIG. 2 shows a sequencing diagram of a possible way of accessing data units.

FIG. 2 shows a possible sequence diagram of how access to data units is accomplished in a distributed data storage device. In the course of working through a process such as a control instruction, a user or a data processing device 28 initiates a data request process 29. This data request process is transmitted to the sequencing controller 30 and worked up 31 by it into appropriate subtasks. One such subtask can consist in, for example, calling up a plurality of data records or information from a storage unit 32. So that the corresponding data records can be accessed, the sequencing controller must determine the corresponding relationships between the data units to be able to access the correct storage unit. An essential security concept of the inventive data storage device is now to be found in the fact that each individual component can be checked to determine whether or not it is approved for the currently initiated process. For this purpose, in a first step, a stored unique key is read out 34 from the assignment table 33 by the sequencing controller 30. According to an elaboration, the key-based security system could also be designed in such a way that it is not the key itself which is read out but that instead a result of the key is generated, which can be compared with a reference key by the sequencing controller 30. The key or the partial result which has been read out is processed 35 as appropriate and transmitted to the authentication device 36. This now performs a comparison check with stored keys at 37 to check the authenticity of the presented key. If the check is successful, the authenticity of the assignment table 33 is established, and the sequencing controller 30 can then issue a read-out request and read out 38 the necessary relationships from the assignment table 33.

Because another security feature of the inventive distributed data storage device consists in that it is impossible to gain direct access to the storage units 32, the sequencing controller 30 must now read out the access control instructions in the next step. For this purpose, in a first step a unique key of the working instructions 39 is read out 40, possibly processed, and sent back to the authentication device 36 for a check 41. If the check is successful, a corresponding request is generated, and then the working instructions are read out 42. Unauthorized direct access to the storage units cannot be excluded with certainty; therefore, it is very highly advantageous that, even in the even of such direct access, the attacker cannot obtain any reasonably useful information. In particular, the information units are present in non-contiguous form and are also possibly encrypted.

After these steps of the method, it is now ensured that the relationships between the data units and the access instructions are authentic. With the use of these data records, it is now possible for the sequencing controller 30 to generate a corresponding storage request 43, so that access can then be gained to the storage unit or units 32 and the corresponding requested data can be read out 44. The data records which have been read out are processed 45 as appropriate by the sequencing controller 30 and sent back to the user or to the data processing device 28, where they are subjected if desired to further processing, worked up, or displayed to the user 46.

The inventive method can offer yet another security functionality in that, for example, a certain query scenario must be adhered to. In the case of an access to a storage unit or in the case of a request to the authentication device to perform a check, it would be possible, in a first, step, to transmit an incomplete request or an apparently false key, after which a correctly formatted request is transmitted. An attacker would ignore this first incorrect request and immediately send a correctly formatted request, as a result of which the attempt at unauthorized access would be detected.

In an elaboration, however, it is also possible for a time stamp to be transmitted together with the request, wherein a correct query scenario is characterized by a specific chronological sequence of requests. Without knowledge of these time relationships, an attacker would send off his requests without coordinating them chronologically, as a result of which, again, the attempt at manipulation can be detected. The time difference could also comprise a pseudo-random dependence, so that the following request must arrive with a time stamp which corresponds to the expected one. A time stamp in this context is not to be understood as an absolute time value, because time delays which cannot be estimated can occur as a result of different travel times over the communications routes. By means of these time stamps, temporal dependencies are established symbolically, which must be followed to allow correct execution of the transaction. For example, a transmitting module can determine the time sequence in which the requests are transmitted. The receiving modules can then determine on the basis of the time stamps whether the sequence of the incoming requests agree with the originally determined sequence.

A potential attacker is therefore confronted with a large number of hurdles, which must be overcome in a precisely synchronized manner in order to conceal an attempt at manipulation.

The figure shows one possible embodiment of the method for enabling access to data records in the inventive distributed data storage device. Not shown in this figure are additional security steps for encrypting the communications between the individual modules or devices.

According to an advantageous elaboration, a second electronic key can also be stored in the storage means, as a result of which it is possible for the access controller of the assignment table or for the access controller of the execute statements to check the authenticity of the sequencing controller. The advantage of the possibility a double authenticity check is therefore obtained, which significantly increases the effort which a potential attacker would have to expend and which thus guarantees a considerable increase in the degree of security and especially in the integrity of the data.

In contrast to known data storage devices, the inventive embodiment offers the very significant advantage that the information concerning the structure of the payload data is separated from the actual payload data and in particular is stored in distributed storage units. As a result of this separation, which possibly can also consist of physical and local separation, unauthorized access to stored data can be made extremely difficult, because a potential attacker would be forced to manipulate a plurality of devices simultaneously, which is extremely improbable, because it would hardly be possible to hide such a large amount of manipulation from a system administrator or from automatic security mechanisms. In particular, individual modules can also be housed in highly secured rooms such as in the computer centers of financial institutions, which make it very difficult to gain access. In particular, as a result of the inventive design of the distributed data storage device, it is ensured that a potential attacker, even with complete knowledge of a storage unit, cannot derive any benefit from it, because he has no knowledge of the relationships to the other storage units and to the corresponding access instructions.

Figure 3:
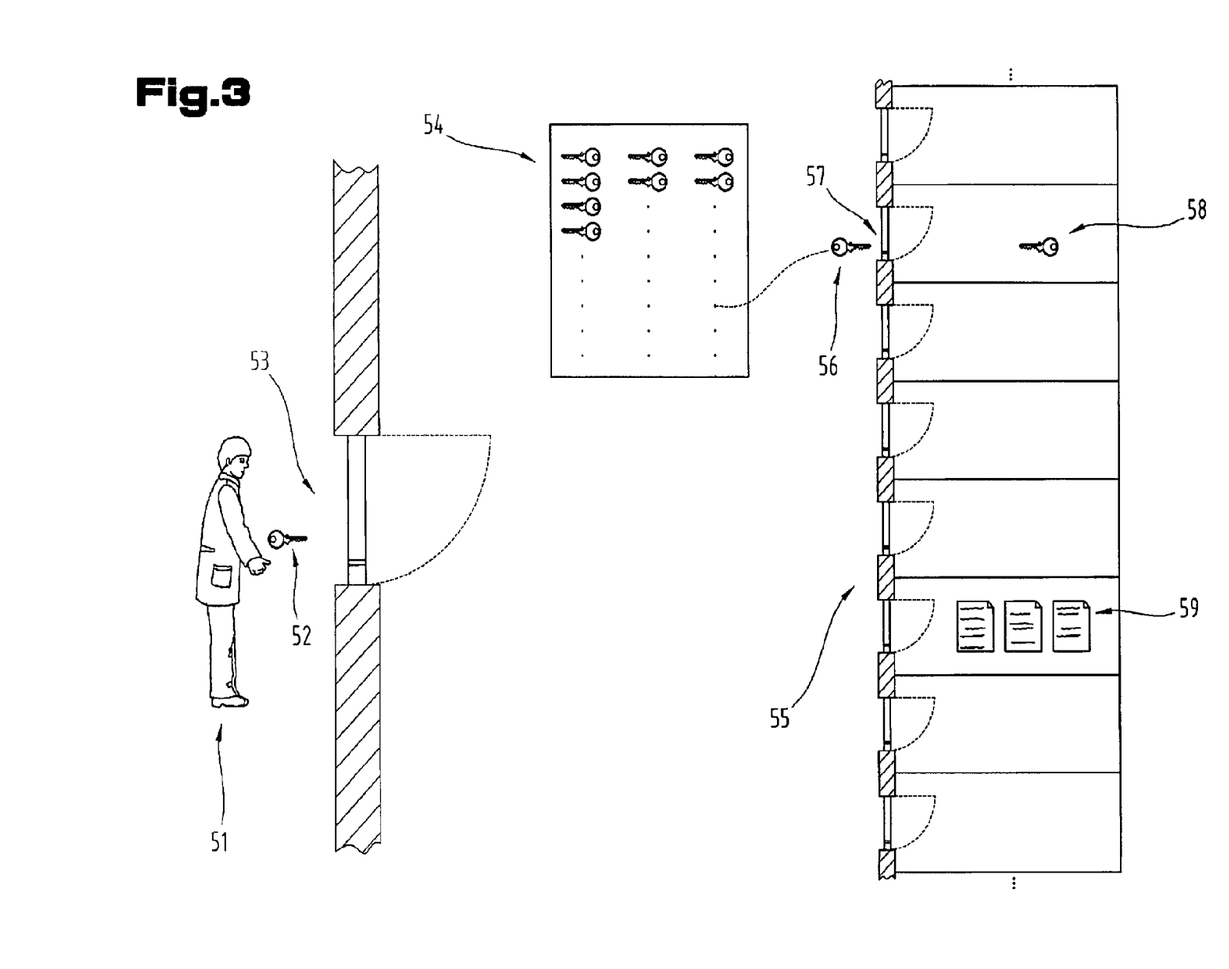
FIG. 3 shows a diagram of an example of the security concept of the inventive data storage device.

FIG. 3 shows by way of example the concept of the security zone 60, 61 of the inventive distributed data storage device. In combination with the authentication of every access, the inventive separation of the payload data units from the monitoring and access information results in a plurality of hurdles for a potential attacker. For the sake of illustration, the figure describes the nature of this access protection by means of a symbolic diagram with doors, keys, and locks.

By manipulation of a component, an attacker 51, for example, comes into possession of a key 52 and can thus open a door 53. This door could be, for example, the assignment table. As a result of this manipulation, the attacker comes into possession of n keys 54 and enters a room with m doors. To proceed further, the attacker must select the correct key 56 from the available keys 54 so that he can open another door. The essential point now is that the attacker must also know the correct door 57, because, if he tries and fails to open a plurality of doors, for example, the manipulation would be detected immediately. If the attacker actually does succeed in opening the door 57, i.e., if he can access the execute statements, for example, he comes into possession of another key 58, which in turn opens one of the possible doors 55. To proceed further and gain access to the relevant data units 59, the attacker must again open one specific door out of the many possible ones.

The use of an incorrect key in an attempt to access the wrong door makes the manipulation attempt immediately detectable, whereupon the appropriate response can be made. In particular, multiple test attacks by the trial-and-error method is ruled out, because a single invalid access attempt can itself be enough to trigger an alarm.

The exemplary embodiments show possible concrete variants of the distributed data storage device, wherein at this point it should be noted that the invention is not limited to the concrete embodiments specifically presented here; on the contrary, various combinations of the individual concrete variants with each other are also possible, and this possibility of variation based on the teaching concerning technical actions through concrete invention lies within the ability of the person actively involved in this technical area. Therefore, all conceivable concrete variants which are possible through combinations of individual details of the illustrated and described concrete variants are covered by the scope of protection.

FIG. 2 shows another, possibly independent, embodiment of the distributed data storage device, wherein again the same reference symbols or component designations as those in the preceding figures are used for the same parts. To avoid unnecessary repetition, reference is made to the detailed description of the preceding FIG. 1.

For form's sake, it should be pointed out in conclusion that, to make it easier to understand the invention, the data storage device or its components are in some cases not shown to scale or are shown enlarged or reduced in size.

The goal on which the independent inventive solutions are based can be derived from the description.

Above all, the individual embodiments shown in the figures can form the object of independent, inventive solutions. The inventive goals and solutions in this regard can be derived from the detailed descriptions of these figures.

LIST OF REFERENCES NUMBERS 1 distributed data storage device
2 storage unit
3 communications network
4 sequencing controller
5 user
6 access monitoring device
7 access control module
8 storage unit
9 authentication device
10 first electronic key
11 key memory
12 electronic key
13 sequencing control module
14 access controller
15 storage means
16 communications link
17 access controller
18 storage means
19 key generation module
20 communications connection
21 communications link
22 communications link
23 encryption module
24 second electronic key
25 key
26 assignment table 27 execute statement
28 user, data processing device
29 data query process
30 sequencing controller
31 processing of the request
32 storage unit
33 assignment table
34 reading out of the key
35 processing
36 authentication device
37 check of authenticity
38 reading out of relationships
39 working instructions
40 reading out of key
41 check of authenticity
42 reading out of instructions
43 storage request
44 reading out of data
45 data processing
46 display, further processing, workup
47 validation device
48 hierarchical sequences
49 storage unit
50 data unit
51 attacker
52 key
53 door
54 key
55 doors
56 key
57 door
58 key
59 data units
60 first security zone
61 second security zone
62 monitoring module

The invention claimed is:

1. A method for the secure storage of data in a distributed data storage system comprising:
providing a distributed data storage system comprising of at least two data storage units, an authentication device with a storage means and a validation device, a sequencing controller with a sequencing control module and an access monitoring device;
generating a plurality of unique electronic keys,
storing data or information in said at least two data storage units, each storage unit comprising of a storage means and an access controller, whereby said access controller is adapted to prevent a request received from a communication link from direct access to the storage means;
checking each access to the data storage units for plausibility;
prohibiting access to said data storage units to those individuals that do not have appropriate security features;
processing a request from a user and calling up the corresponding information from the data storage units by said sequencing controller, wherein said sequencing controller being connected to the data storage units and to the authentication device by a communications network;
transmitting the request to the user or to said sequencing controller used by the user;
storing at least one first and second stored electronic keys in the storage means of the authentication device, the access control module, or combinations thereof;
storing a first unique electronic key, said first electronic key adapted to correspond to a stored electronic key of the authentication device wherein a unique relationship between the first electronic key and the stored electronic key in each of the data storage units and the at least one additional storage unit of the access control module is maintained;
storing a second electronic key in said at least two data storage units and said at least one access monitoring device storage unit, each said second stored electronic key corresponding to said second stored electronic key in the authentication device;
storing an assignment table and execute statements in the storage units of the access monitoring device;
dividing information units over the individual storage units to prohibit access to the content of another storage unit, to prohibit a query of a complete, usable data record, or combinations thereof; and
providing at least one security zone within the data storage system;
checking the plausibility of currently running actions in the security zone.

2. The method of claim 1, wherein at least one electronic key is authenticated by the authentication device before access to a data unit stored in the storage means of the storage units.

3. The method of claim 1 wherein the assignment table is queried when a user or a data processing device requests access.

4. The method of claim 1, wherein the execute statement is queried when a user or a data processing device requests access.

5. The method of claim 1, wherein at least one electronic key is authenticated by the authentication device before access to the assignment table stored in the storage means of the storage unit.

6. The method of claim 1, wherein at least one electronic key is authenticated by the authentication device before access to the execute statement stored in the storage means of the storage unit.

7. The method of claim 1, wherein the sequencing controller uses a correct stored key to authenticate itself to the authentication device.

8. The method of claim 2 further including the step of proving an alarm notification if the authentication fails.

9. The method of claim 1, wherein when a request is received from the sequencing controller, said access controller of the storage units compares a stored second electronic key with a key of the sequencing controller.

10. The method of claim 1, wherein when a request is received from the sequencing controller, said access controller of the storage units compares a stored second electronic key with a key of the authentication device.

11. The method of claim 1, wherein the access controller accesses data units stored in said at least two data storage units by means of a transmitted execute statement.

12. The method of claim 1 further including the step of storing a linkage of a hierarchical sequence and a storage unit in the assignment table.

* * * * *